UNITED STATES PATENT OFFICE.

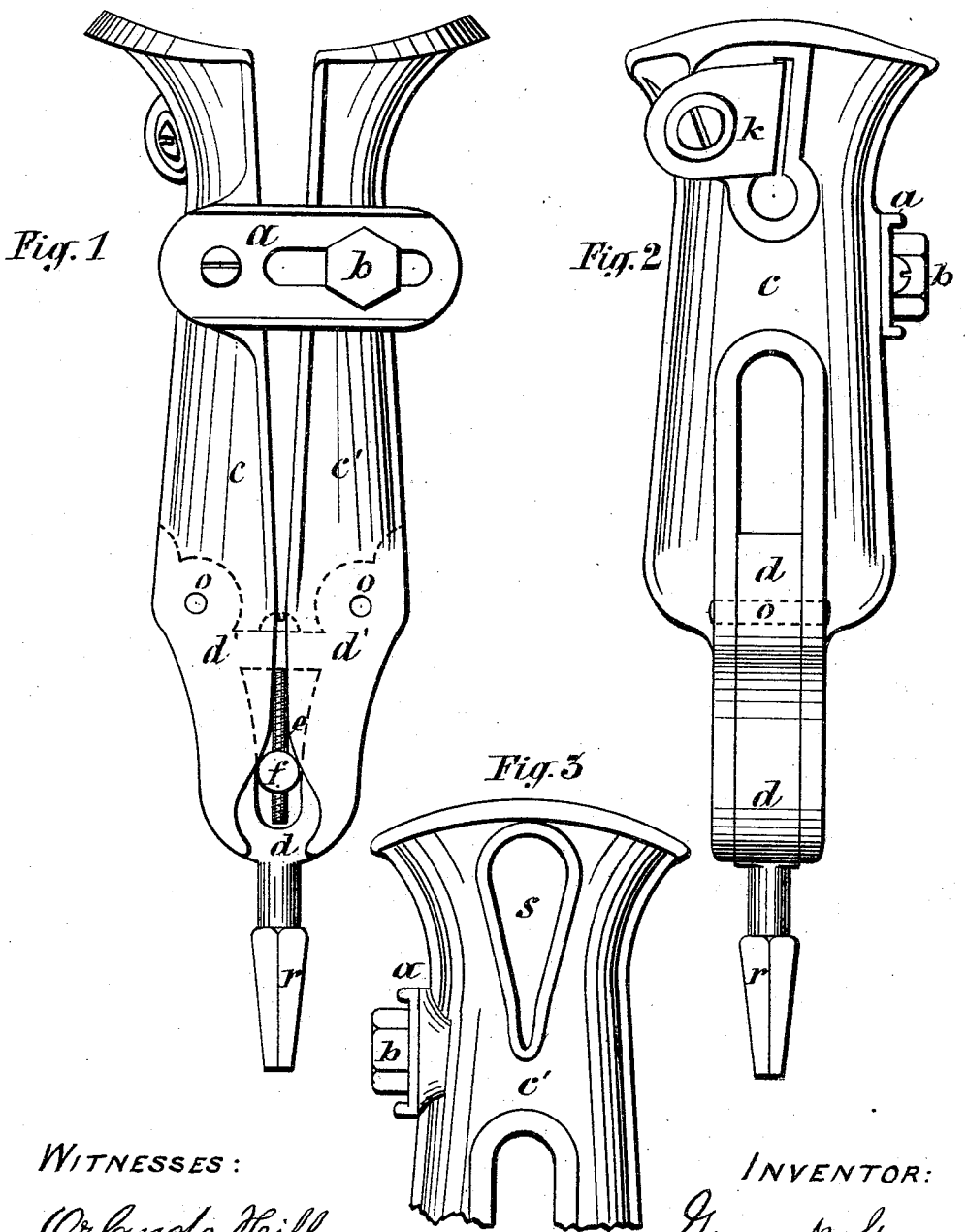

GEORGE N. STEARNS, OF SYRACUSE, NEW YORK.

IMPROVEMENT IN FORE-AUGERS.

Specification forming part of Letters Patent No. 181,874, dated September 5, 1876; application filed July 11, 1876.

*To all whom it may concern:*

Be it known that I, GEORGE N. STEARNS, of Syracuse, New York, have invented an Improvement in Fore Augers, the use of which is to cut away the bulk of the end of a spoke before using a hollow auger. The knife is set at an angle that enables it to cut the grain of the timber with greater ease than the hollow auger which follows it to make the size and square the shoulder of the spoke, thus facilitating the operation of tenoning spokes, of which the following is a specification:

My invention consists of a shank made to fit an ordinary bit-brace, having two curved arms connected with a cross-piece, the center of which is provided with a circular orifice allowing a screw to pass through into a slot in the shank. The screw also passes through a circular wedge or pin, which is provided with a thread, so that as the screw is turned it moves up or down on the screw. Upon the upper part of the shank on each arm is pivoted a jaw, having in it a mortise, allowing it to fit on over the curved arm of the shank. The upper part of the jaws swell out, forming a large funnel-shaped mouth. One jaw or side has a slot at the upper part, on one side of which a knife is set at an acute angle to a line drawn through the center of the auger, the knife being held in position by a washer and screw. In the opposite jaw at the upper part there is a taper-curved aperture. The two jaws are held in position by means of a strap secured on one side by a screw, and upon the other with a hexagon-headed bolt. The lower ends of the jaws or sides are curved on the inner edges, so as to form, when pressed together, a taper or pear shaped opening, with the large end down. The space thus left between the curved edges allows the circular wedge or pin to move up and down between them, so as to permit the jaws to spread apart or open when the wedge is at its lowest point, and to close or bring the jaws together as it is drawn up on the screw before described.

The several parts are constructed of metal, and so arranged that the same will be combined in a firm and compact body, and thus form a substantial device for the purpose specified.

In the drawings, Figure 1 represents a front view of my newly-invented fore auger.

The letter $d$, Figs. 1 and 2, designates the shank of the auger, having in the cross-piece marked $d'$ $d'$, in Fig. 1, an orifice, which allows the screw $e$ to pass into the slot indicated by dotted lines, and through the wedge or pin $f$ the lower part of the shank, marked $r$, is formed to fit an ordinary bit-brace. On the upper part of the shank $d$ the jaws or sides $c$ $c'$ are pivoted, held securely by the rivets $o$ $o$.

In Fig. 2 the mortise in the side of the jaw, and the manner in which the jaws or sides are fitted onto the shank, are shown. At the upper part of the jaw $c$ is the slot and the knife $k$, held by a washer and screw, and set at an acute angle to a line drawn through the center of the auger. Below the slot is a circular throat, which allows the shavings to pass through, preventing the knife becoming clogged.

By means of the screw $e$, Fig. 1, the wedge or pin $f$, and the tapering inner edges of the jaws, I am enabled to open or close, or expand and contract, the jaws, thus adjusting from one half inch, when the wedge is at its highest point, to one and a half inch, when at its lowest point, and to all intermediate sizes between those extremes.

The jaws or sides $c$ $c'$ are securely held at any point of adjustment by the strap $a$, provided with a slot in which the hexagon bolt $b$, operated with a wrench, slides, thus permitting the opening and closing of the auger. The strap is secured on the jaw $c$ by a screw, and upon the jaw $c'$ by the hexagon-headed bolt $b$.

When the auger is open to its full extent it presents a circular appearance at the foot of the knife. As it closes it assumes an elliptical shape.

In order to compensate for the difference in centers as the adjustment is changed, and to overcome the tendency to cut more on one side of the spoke than upon the other, occasioned by changing from a circle to an ellipse, I provide the taper-curved aperture S, Fig. 3, in the side or jaw $c'$, directly opposite knife $k$. This aperture performs its office by allowing the part of the spoke being cut to project into the widest or upper portion of the aperture while being trimmed in the funnel-mouth of the auger, and as the spoke enters the auger at the foot of the knife the lower part of the aperture forms, with its two sides, a guide or bearing, keeping the auger central as it cuts its way on the spoke. Now, as the auger is adjusted to a smaller size the mouth presents an oval or elliptical shape, and the end of the spoke projects farther down into the taper, which is accurately graduated, so as to compensate all the changes, and to adapt itself to each size of the adjustment, thus producing this desired result.

I claim as my invention—

1. The two adjusting-jaws $c$ $c'$, with funnel-shaped mouth, in combination with each other and the knife $k$, set at an acute angle, substantially as herein shown and described, for the purpose specified.

2. The shank $d$, the screw $e$ passing through the cross-piece $d'$ $d'$, the wedge or pin $f$, in combination with two jaws, $c$ $c'$, held by the strap $a$, substantially as and for the purpose specified.

3. The adjustable jaw $c'$ or its equivalent, provided with the taper-curved aperture S, substantially as herein shown and described, and for the purpose specified.

GEO. N. STEARNS.

Witnesses:
  ORLANDO HILL,
  W. SANDERS.